United States Patent [19]
Cordova et al.

[11] Patent Number: 5,767,509
[45] Date of Patent: Jun. 16, 1998

[54] FIBER OPTIC SENSOR COIL INCLUDING BUFFER REGIONS

[75] Inventors: Amado Cordova, West Hills; Samuel N. Fersht, Studio City, both of Calif.

[73] Assignee: Litton Systems, Inc., Woodland Hills, Calif.

[21] Appl. No.: 774,109

[22] Filed: Dec. 24, 1996

[51] Int. Cl.$^6$ .............................. G01J 5/08; G01C 19/64
[52] U.S. Cl. ............................. 250/227.19; 356/350
[58] Field of Search ................. 250/227.19, 231.13; 356/345, 350, 351, 356; 385/12, 13, 128

[56] References Cited

U.S. PATENT DOCUMENTS

| | | | |
|---|---|---|---|
| 4,699,451 | 10/1987 | Mohr | 356/350 |
| 4,793,708 | 12/1988 | Bednarz | 356/350 |
| 4,856,900 | 8/1989 | Ivancevic | 356/350 |
| 4,883,337 | 11/1989 | Dahlgren | 356/350 |
| 5,056,885 | 10/1991 | Chinn | 356/350 |
| 5,260,768 | 11/1993 | Cordova et al. | 356/350 |
| 5,333,214 | 7/1994 | Huang et al. | 385/12 |
| 5,351,900 | 10/1994 | Torney | 356/350 |
| 5,371,593 | 12/1994 | Cordova et al. | 356/350 |
| 5,486,922 | 1/1996 | Cordova | 356/350 |
| 5,545,892 | 8/1996 | Bilinski et al. | 250/231.12 |
| 5,546,482 | 8/1996 | Cordova et al. | 385/12 |

OTHER PUBLICATIONS

N. J. Frigo, "Compensation of Linear Sources of Non-reciprocity in Sagnac Interferometers", *Fiber Optics and Laser Sensors I*, proc. SPIE vol. 412, p. 268 (1983).

D. M. Shupe, "Thermally Induced Nonreciprocity in the Fiber Optic Interferometer," *Applied Optics*, vol. 19(5), pp. 654–655 (1980).

*Primary Examiner*—Stephone B. Allen
*Attorney, Agent, or Firm*—Elliott N. Kramsky

[57] ABSTRACT

A sensor coil for a fiber optic gyroscope. At least one dummy layer forms an integral structure with, and shares the thermal expansion characteristics of, a potted coil comprising a plurality of layers of windings of a first optical fiber. In a gyroscope, the potted coil is arranged to receive the output of a source of optical energy as a pair of beams that counter-propagate therein and to provide the resultant interference pattern, as gyro output, to a detector. The dummy layer displaces layers or windings of the potted coil from regions likely to contribute to Shupe bias effects.

19 Claims, 4 Drawing Sheets

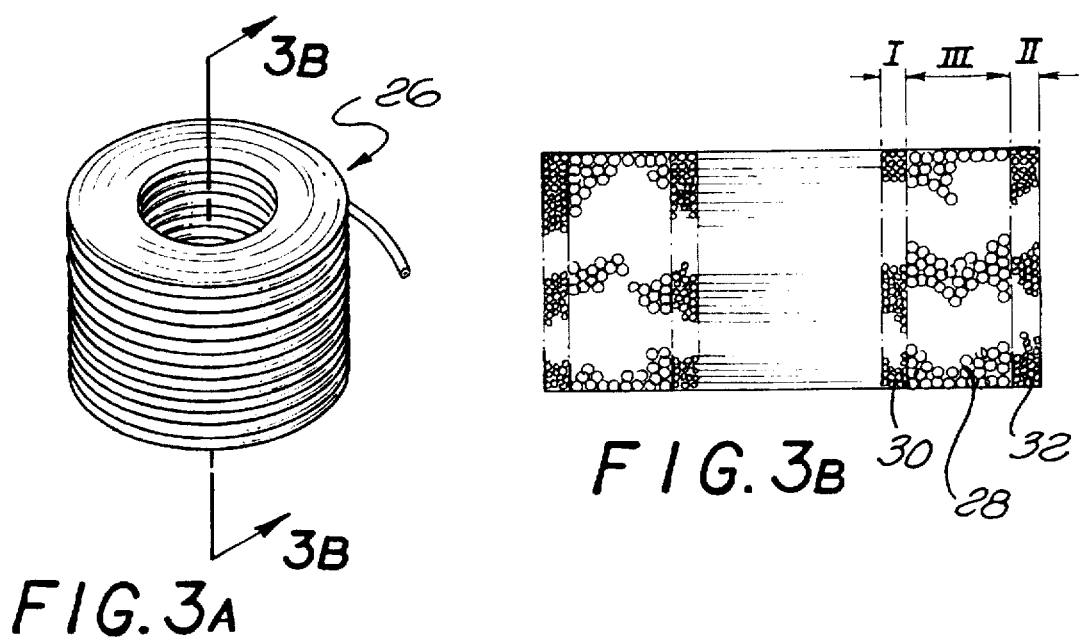
FIG. 3A
FIG. 3B
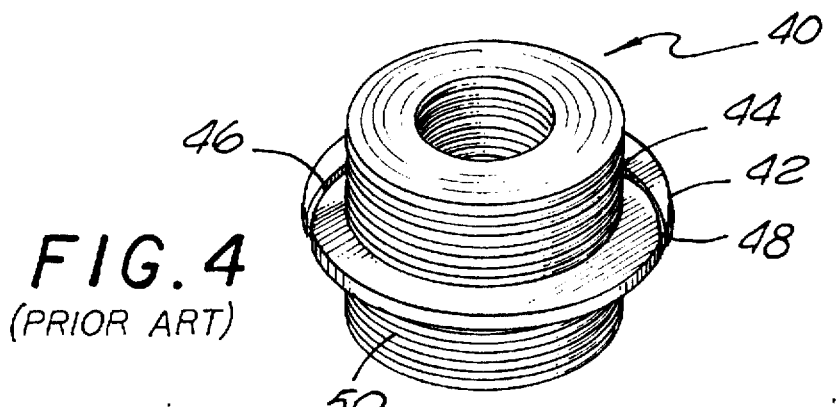
FIG. 4
(PRIOR ART)
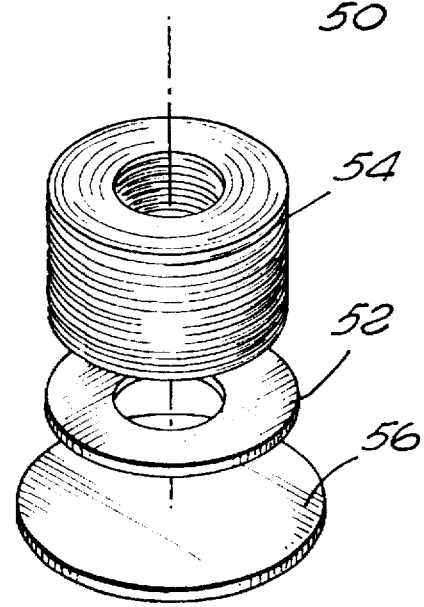
FIG. 6A
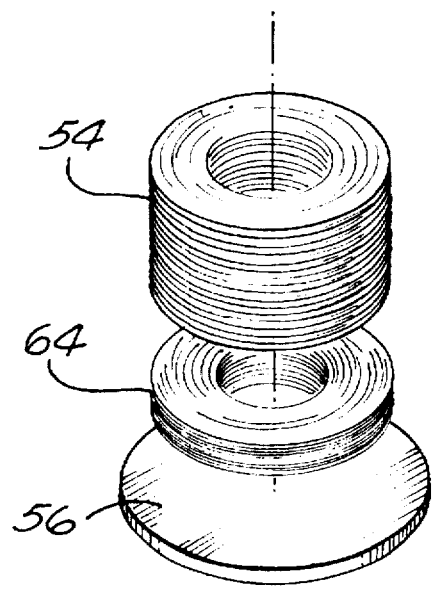
FIG. 6C

FIBER OPTIC SENSOR COIL INCLUDING BUFFER REGIONS

BACKGROUND

1. Field of the Invention

The present invention relates to fiber optic gyroscopes. More particularly, this invention pertains to gyro sensor coil designs for minimizing environmentally-induced bias errors due to the Shupe effect.

2. Description of the Prior Art

An interferometric fiber optic gyroscope comprises the following main components: (1) a light source, (2) two beamsplitters (fiber optic directional coupler and/or integrated-optic Y-junctions) to satisfy the requirement of a "minimum reciprocal configuration" (S. Ezekiel and M. J. Arditty, *Fiber Optic Rotation Sensors* New York, Springer-Verlag p. 2–26 1982), (3) a fiber optic sensing coil made of either polarization maintaining (PM) fiber or made of low-birefringence (standard telecommunications) fiber, (4) a polarizer (and sometimes one or more depolarizers), and (5) a detector. Light from the light source is split by the loop beamsplitter into copropagating and counterpropagating waves travelling in the sensing coil. The associated electronics measures the phase relationship between the two interfering, counter-propagating beams of light that emerge from opposite ends of the coil. The difference between the phase shifts experienced by the two beams is proportional to the rate of rotation of the platform to which the instrument is fixed, due to the well-known Sagnac effect.

Environmental factors can affect the measured phase shift difference between the counterpropagating beams, thereby introducing a bias error. Such environmental factors include variables such as temperature, vibration (acoustical and mechanical) and magnetic fields. An important source of bias error in the fiber optic gyro is known in the art as the Shupe effect. The Shupe bias error arises when time-dependent environmental perturbations (thermal, acoustical, vibrational, etc.) act on the gyro sensing coil by varying the optical light path length that each counterpropagating wave traverses as it travels through the coil. The phase shifts induced upon the two waves are unequal, producing a net undesirable phase shift which is indistinguishable from the rotation-induced signal.

One approach to attain a reduction of Shupe bias errors has involved the use of various symmetric coil winding configurations. In such coils, the windings are arranged so that the geometrical center of the coil is located at the innermost layer while the two ends of the coil are located at the outermost layers.

N. Frigo has proposed the use of particular winding patterns to compensate for Shupe non-reciprocities in "Compensation of Linear Sources of Non-Reciprocity in Sagnac Interferometers". *Fiber Optics and Laser Sensors I*, Proc. SPIE Vol. 412 p. 268 (1983). Furthermore, U.S. Pat. No. 4,793,708 of Bednarz entitled "Fiber Optic Sensing Coil" teaches a symmetric fiber optic sensing coil formed by dualpole or quadrupole winding. The coils described in that patent exhibit enhanced performance over the conventional helix-type winding.

U.S. Pat. No. 4,856,900 of Ivancevic entitled "Quadrupole-Wound Fiber Optic Sensing Coil and Method of Manufacture Thereof" teaches an improved quadrupole-wound coil in which fiber pinching and microbends due to the presence of pop-up fiber segments adjacent the end flanges are overcome by replacing such pop-up segments with concentrically-wound walls of turns for climbing between connecting layers. Both of the aforementioned United States patents are the property of the assignee herein.

While appropriate coil winding techniques can reduce the Shupe bias error occasioned by the assymetry of environmental factors, they do not address all the sources of environmentally-induced bias errors in gyro output.

SUMMARY OF THE INVENTION

The foregoing and additional shortcomings and disadvantages of the prior art are addressed by the present invention that provides, in a first aspect, a sensor coil for a fiber optic gyroscope. Such a coil includes a first optical fiber. The fiber is arranged into a plurality of concentric cylindrical layers. Each of the layers comprises a plurality of turns arranged in a predetermined winding pattern so that the first fiber forms a toroidal shape bounded by substantially cylindrical, concentric inner and outer surfaces and substantially parallel, annular upper and lower edge planes. The coil is encapsulated in potting material and includes a boundary layer bonded to at least one of the surfaces to form an integral structure with the potted coil.

In a second aspect, the invention provides a fiber optic gyroscope that includes a source of optical energy and a detector. Means are provided for coupling the output of the source into a sensor coil whereby the output is formed into a pair of beams that counterpropagate therein. Means are additionally provided for coupling the output of the sensor coil to the detector. The sensor coil comprises an integral structure that includes a responsive member comprising a first optical fiber wound in a predetermined pattern forming a plurality of layers of turns. A second member is fixed to and covers a surface of the responsive member. The gyroscope is arranged so that the output of the source of optical energy is coupled into the responsive member and the output of the responsive member is coupled to the detector.

The preceding and other features and advantages of the invention will become further apparent from the detailed description that follows. Such description is accompanied by a set of drawing figures. Numerals of the drawing figures, corresponding to those of the written text, point to the various features of this invention with like numerals referring to like features throughout.

BRIEF DESCRIPTION OF THE DRAWINGS

FIGS. 3A and 3B are a perspective view of a gyro sensor coil in accordance with the invention and a cross-sectional view of a portion thereof taken at line 3B—3B of FIG. 3A respectively;

FIG. 4 is a perspective view of a gyro sensor coil mounted upon a flange in a split configuration;

FIGS. 6A through 6E are perspective and sectional views of various embodiments of gyro sensor coils in accordance with the invention.

DETAILED DESCRIPTION

Figure 1:
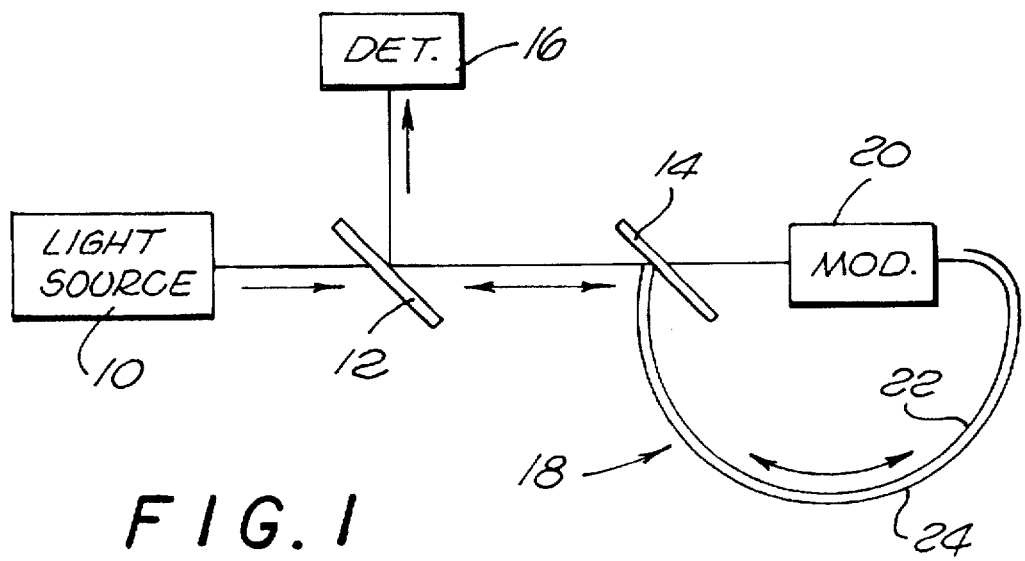
FIG. 1 is a schematic view of a fiber optic gyroscope incorporating a sensor coil in accordance with the invention.

FIG. 1 is a schematic view of a fiber optic gyroscope incorporating a sensor coil in accordance with the invention.

The gyroscope comprises a broadband light source 10, beamsplitters (fiber directional couplers and/or integrated-optic Y-junctions) 12 and 14 to route the light, a photodetector 16, a sensor coil 18 that acts as the rotation sensing component and a phase modulator 20 consisting, for example, of a piezoelectric cylinder or a single-channel LiNbO$_3$ waveguide modulator. A "push-pull" arrangement with two waveguide modulators within a single LiNbO$_3$ chip is a straightforward extension.

The sensor coil 18 of the invention comprises multiple structural elements. A first element 22 is optically coupled to the other elements of the rotation-sensing system, comprising a multiturn coil 22 of optical fiber that receives the output of the light source 10, transformed into a pair of beams that counterpropagate therein by the beamsplitter 14, to provide a signal to the photodetector 16 that indicates rotation of the attached platform. A second element 24 (which may, in fact, comprise a number of discrete structures) completes the sensor coil 18. The element 24 may comprise windings of optical fiber or a wafer(s) of thermally-compatible material formed integral with the first element 22. The first and second elements 22 and 24 are structurally integrated to form a mechanically coherent structure. The second element 24 is not, however, optically coupled to the other elements of the fiber optic gyroscope. Rather, as will be seen below, the second element 24 effectively replaces those portions of the sensor coil 18 that are most vulnerable to thermal perturbations and consequent Shupe bias effects.

I. Compensation of Bias Due to Coil Structure

Figure 2:
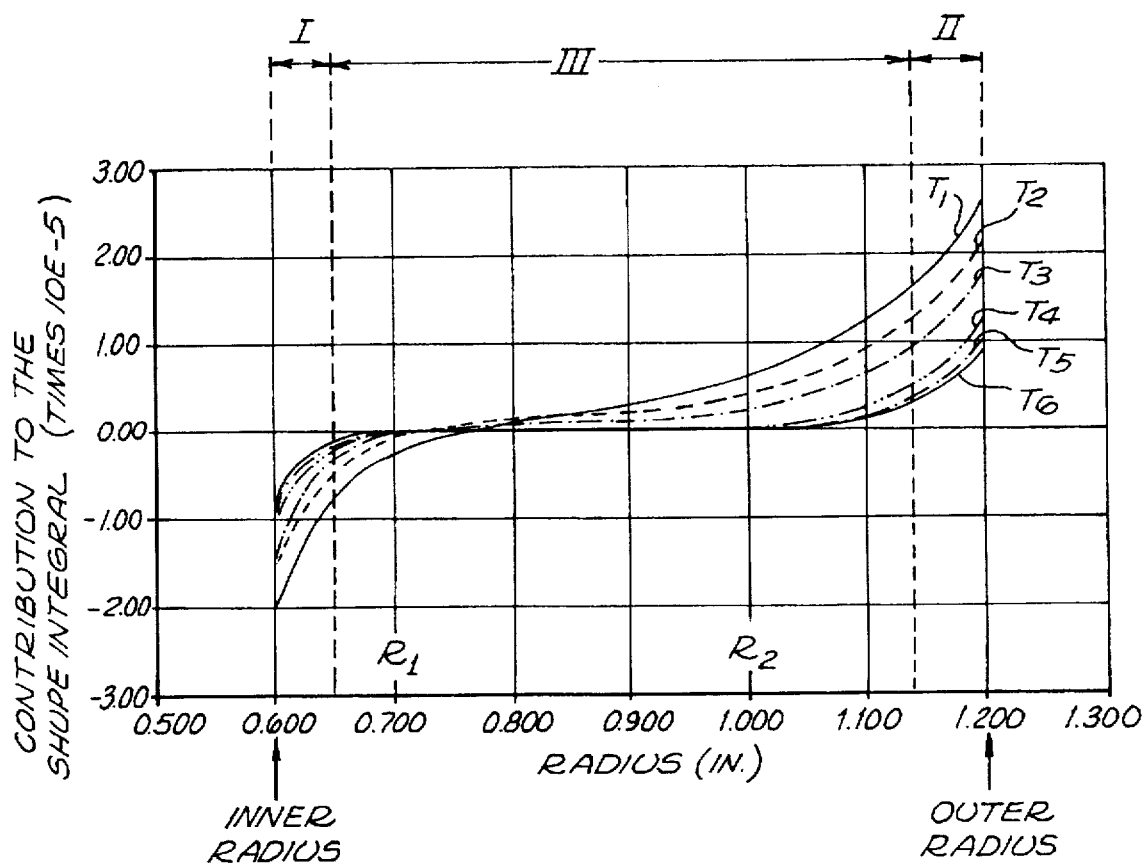
FIG. 2 is a graph of analytically-derived contributions to the Shupe integral as a function of fiber location within a potted sensor coil.

FIG. 2 is a graph of analytically-derived contributions to the Shupe integral as a function of fiber location (i.e. coil turn radius) within a sensor coil. The graph represents the result of the mathematical modeling of a coil formed of a continuous optical fiber wound in a thread pattern to form a toroidally-shaped structure that is potted in a material such as those disclosed in U.S. patent application Ser. No. 5,546,482 entitled "Potted Fiber Optic Gyro Sensor Coil for Stringent Vibration and Thermal Environments" of A. Cordova and G. M. Surabian, property of the assignee herein.

A family of curves is plotted in FIG. 2, each corresponding to a different coil temperature $T_i$. As can be seen, regardless of temperature, the contributions to the Shupe integral deviate significantly from zero as one approaches both the inner and outer layers of turns of the wound sensor coil. Thus, the greatest contributions to Shupe bias error by a toroid-shaped thread-wound potted sensor coil occur as the light counterpropagates through the innermost and outermost layers of windings. For the case of a dualpole or a quadrupole wind, the plots of contributions to the Shupe bias errors of FIG. 2 are modified by a weighting factor. This weighting factor (the distance to the midpoint) reduces the contributions of the innermost layers, and increases the contributions of the outermost layers.

In the present invention, Shupe bias errors are accordingly minimized by replacing those portions of the sensor coil 18 with a so-called dummy layer(s) that forms a portion(s) of the wound coil structure yet does not carry or transmit any rotation-sensitive optical signals. Such layer(s) constitute the second element 24 of the sensor coil 18 as referenced in FIG. 1.

The reason this approach can reduce Shupe bias errors is as follows. If the dummy layers have thermomechanical properties similar to those of the potted sensor coil, then the plots of contributions to the Shupe integral, as shown in FIG. 2, are not modified by the presence of the dummy layers (regions I and II), except for the fact that the Shupe integral now involves only region III (the rotation-sensing element). Region III comprises fiber layers for which the contributions to the Shupe integral are small for all temperatures. Therefore, the integral over region III yields a small Shupe bias error.

The radial extent of the dummy layers (i.e., size of the regions I and II) is dictated by a compromise between Shupe bias reduction and overall gyro size or Sagnac scale factor. Increasing the radial extent of the dummy layers (for example to radii R1 and R2 in FIG. 2) can further reduce the Shupe bias error. However, this also reduces the size of the rotation-sensing element, and thus reduces the effective coil length and the effective Sagnac scale factor. Conversely, should the coil length and Sagnac scale factor be maintained, adding the dummy layers will result in increased gyro size. The tradeoff will depend on the specific gyro application.

For the specific case of a dualpole or a quadrupole winding pattern, a substantial reduction in Shupe bias can be achieved by utilizing only the outer dummy layer (region II) since, for these winds, the contribution of the outer layers to Shupe bias error is largely dominant.

FIGS. 3A and 3B are perspective and cross-sectional views, respectively, of a gyro sensor coil 26 in accordance with the invention. As seen in FIG. 3B, the interior layers of the toroid-shaped coil 26 (region III) comprise windings of a first optical fiber 28 while the inner and outer regions "I" and "II" comprise layers of windings of optical fibers 30 and 32 respectively. The fibers 28, 30 and 32 are not optically coupled to one another, the fiber 28 corresponding to the first (sensing) element 22 and the windings of the fibers 30 and 32 corresponding to the second (non-sensing) element 24. That is, the layers of windings of the fibers 30 and 32 form "dummy" elements those of the fiber 28 form the rotation-sensitive element of the sensor coil 26. Referring back to the plot of contributions to the Shupe integral versus coil radius (FIG. 2), it is seen that the dummy elements of the sensor coil 26 fill regions I and II adjacent the inner and outer radial extrema where maximum values of Shupe bias contribution are observed. Most significantly, the layers of windings of the fiber 28 that form the rotation-sensitive portion of the sensor coil 26 are absent from regions I and II. As previously stated, for the case of a dualpole or a quadrupole wind, a single dummy layer occupying region II is sufficient to substantially reduce the Shupe bias error.

II. Compensation of Bias Due to Coil Mount

FIG. 4 is a perspective view of a prior art potted gyro sensor coil 40 and mounting flange 42 generally in accordance with U.S. patent application Ser. No. 08/526,725, property of the assignee herein. A split coil configuration is employed wherein one-half of the turns of the preferably quadrupole-wound coil 40 lie above, and one-half lie beneath, the flange 42 which projects from a central hub (not shown). An analysis of Shupe bias effects will proceed with reference to the coil 40 of FIG. 4. Later, it will be seen that the results of such analysis may be applied to other coil designs and mounting arrangements.

The first or upper half 44 of the coil 40 is wound above the metallic flange 42. For the case in which such a wind follows a quadrupole pattern, there are at least two ways to begin. The wind can commence at the top of the half coil (opposite the metallic flange) or at the bottom of the half coil (against the metallic flange). Upon completion, the fiber leads are routed through edge cuts 46 and 48 below the flange 42. The fiber leads are then wound to form a lower half coil 50. Once again, in the case of a quadrupole pattern, the second winding can start either at the top of the half coil (against the flange) or at the bottom of the half coil (opposite the flange).

Figure 5A:
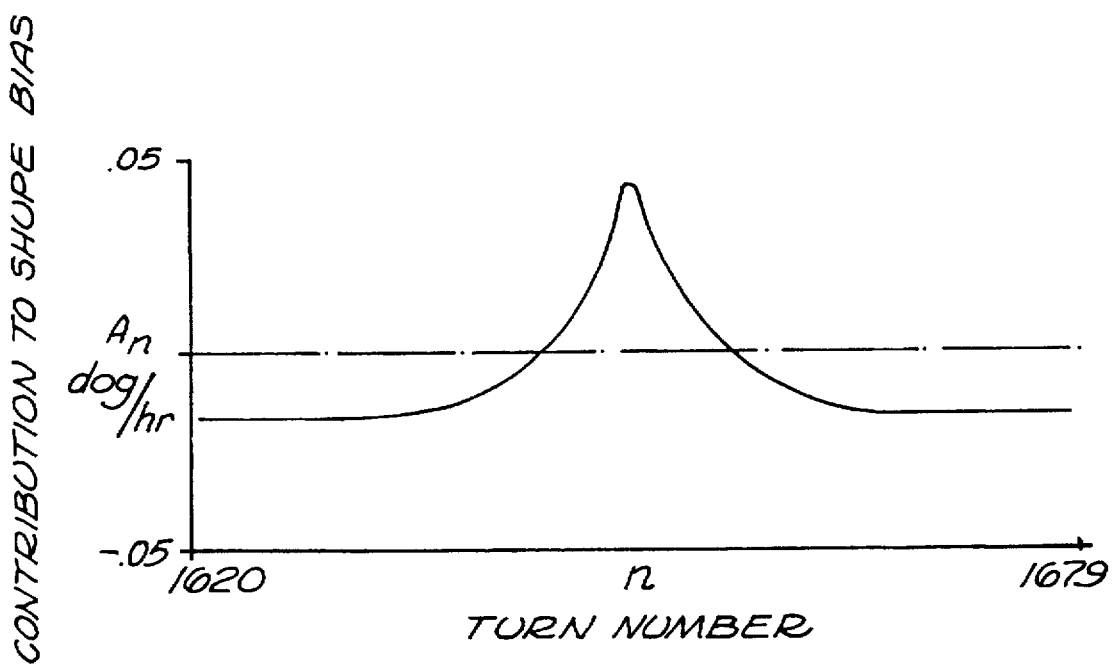
FIGS. 5A and 5B are analytically-derived plots of contributions to Shupe bias per turn for the turns of the last bilayer of the top half and for the last bilayer of the bottom half, respectively, of a gyro sensor coil in accordance with FIG. 4.
Figure 5B:
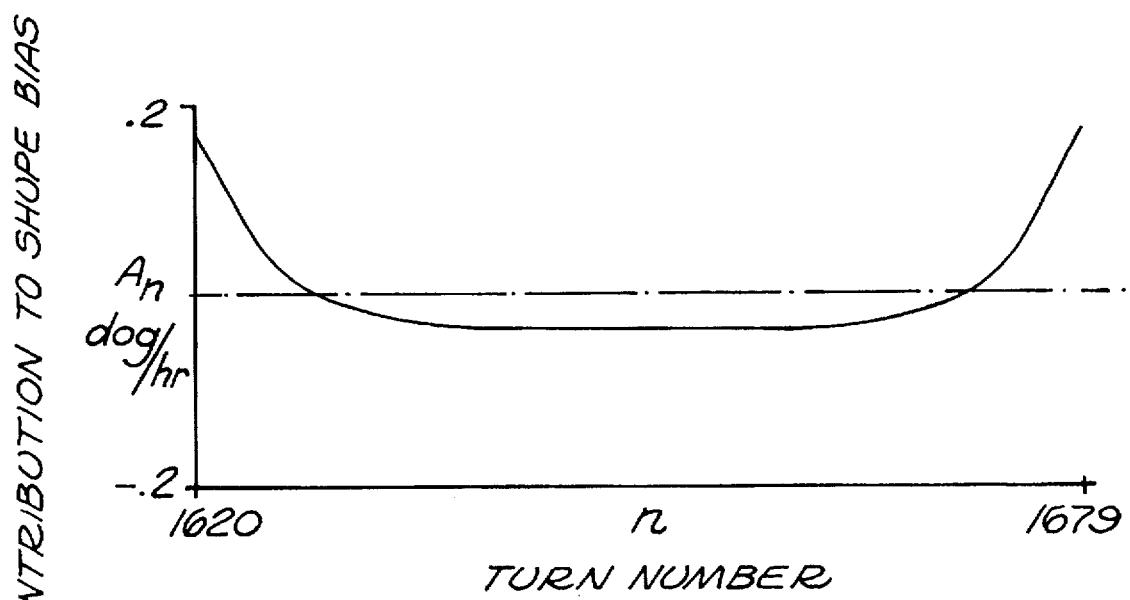

FIGS. 5A and 5B are analytically-derived plots of the contributions to Shupe bias (per turn) of the turns of the last bilayer of the top half 44 and the last bilayer of the bottom half coil 50. In this analysis it was assumed that the top half coil was begun at the top (opposite the flange) and the bottom half coil also begun at the top (against the flange). As can be seen from FIG. 5A, the largest contributions to Shupe bias for the top half coil correspond to turns at the middle of the bilayer while (see FIG. 5B) the largest contributions to Shupe bias for the bottom half coil correspond to turns at the beginning and the end of the bilayer. In both cases, the largest contributions result from turns that are in contact with or very close to the metallic flange 42, suggesting that the regions of the active coil most subject to Shupe bias effects occur at layers adjacent the flange 42.

FIGS. 6A through 6E are a series of views that illustrate various embodiments of the present invention. Each embodiment comprises a sensor coil that includes both a rotation-sensitive section of wound and potted optical fiber and at least one dummy or rotation-insensitive portion. In each embodiment, the rotation-sensitive section is suitable for optical coupling to the remainder of the fiber optic gyro system as shown in FIG. 1. The dummy element(s) "replaces" a portion of the sensor coil which would otherwise serve as a source of a relatively-significant degree of Shupe bias error. The design of each coil embodiment in accordance with the invention relies upon the matching of the properties of the dummy element(s) to those of the potted rotation-sensitive element so that the reduction of Shupe bias is not counteracted by the introduction of stresses between the rotation-sensitive and dummy elements. This can be readily accomplished if, for example, the rotation-sensitive and insensitive portions comprise optical fiber (or equivalent) and potting material. The optical fibers comprising the two elements are preferably similar while the potting material may be commonly applied to the two or more distinct wound elements to assure a unitary overall sensor coil structure.

FIGS. 6A through 6E are exploded perspective and cross-sectional views of sensor coils in accordance with the invention that address reduction of Shupe bias error in a manner analogous to that employed to reduce Shupe bias resulting from coil structure. As discussed above, the larger contributions to Shupe bias are observed to occur at the coil-to-mount interface. In accordance with the invention, a dummy element replaces the rotation-sensitive layers in such region.

Figure 6B:
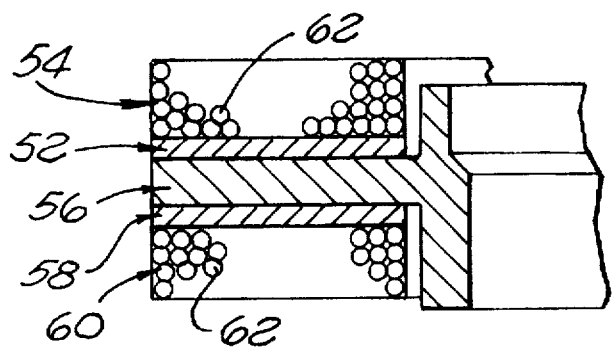

Referring first to the arrangement shown in the exploded perspective view of FIG. 6A and in sectional view in FIG. 6B, a disk 52, whose thermal characteristics are matched to those of a potted wound coil 54, provides an interface between the rotation-sensitive coil 54 and a metallic mounting flange 56. The disk 52 provides the functional and mechanical equivalent of a number of layers of windings of a dummy coil. It should be noted that the cross-sectional view of FIG. 6B discloses a split-coil design in which the rotation-sensitive coil 54 provides the upper (i.e., above mounting flange 56) half of the overall coil, whereas, in FIG. 6A, element 54 represents the complete, rotation-sensitive, potted coil.

In FIG. 6B, a second disk 58 is formed of material that is thermally compatible with a lower half coil 60 (whose windings, per FIG. 4, are formed of the same optical fiber 62 the upper coil 54). As in the case of the embodiment of the invention disclosed in FIGS. 3A and 3B, the disks 52, 58 form integral structures with the rotation-sensitive potted half-coils 54 and 60 in the sense that the two elements are, in each case, structurally integrated and thermally matched to form, in effect, single mechanical structures. Thus the invention attains the removal of the rotation-sensing function from the regions of the wound coil structure that exhibit the largest contributions to Shupe bias error.

Figure 6D:
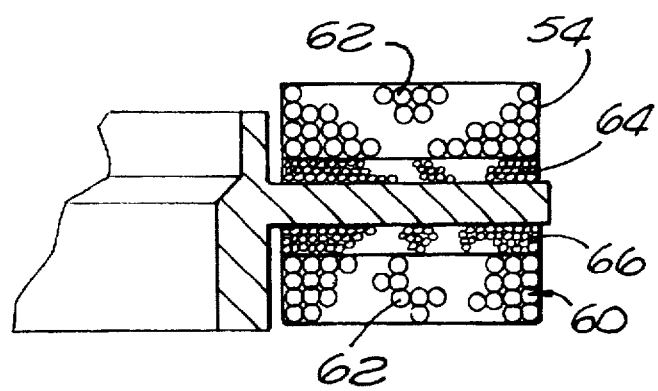

FIGS. 6C and 6D are exploded perspective and cross-sectional views of sensor coils in accordance with the invention. Such embodiments differ from the prior embodiments only insofar as dummy elements comprising layers of windings 64 and 66 replace the disks 52 and 58 of the prior embodiment. In operation, the embodiment of FIGS. 6C and 6D, just as the embodiment of FIGS. 6A and 6B, is consistent in design approach to the embodiment of FIGS. 3A and 3B for removing the rotation-sensitive element from the regions of high Shupe bias contributions occurring at the inner and outer radii of the toroid-shaped sensor coil. As before, the composite design, including both rotation-sensitive and dummy elements, comprises an integral structure. For example, they may be bonded together by common potting material. Thermal matching between the rotation-sensitive and dummy elements can be accomplished (for example) when the dummy element comprises layers of turns of optical fiber as illustrated in FIGS. 6C and 6D.

Figure 6E:
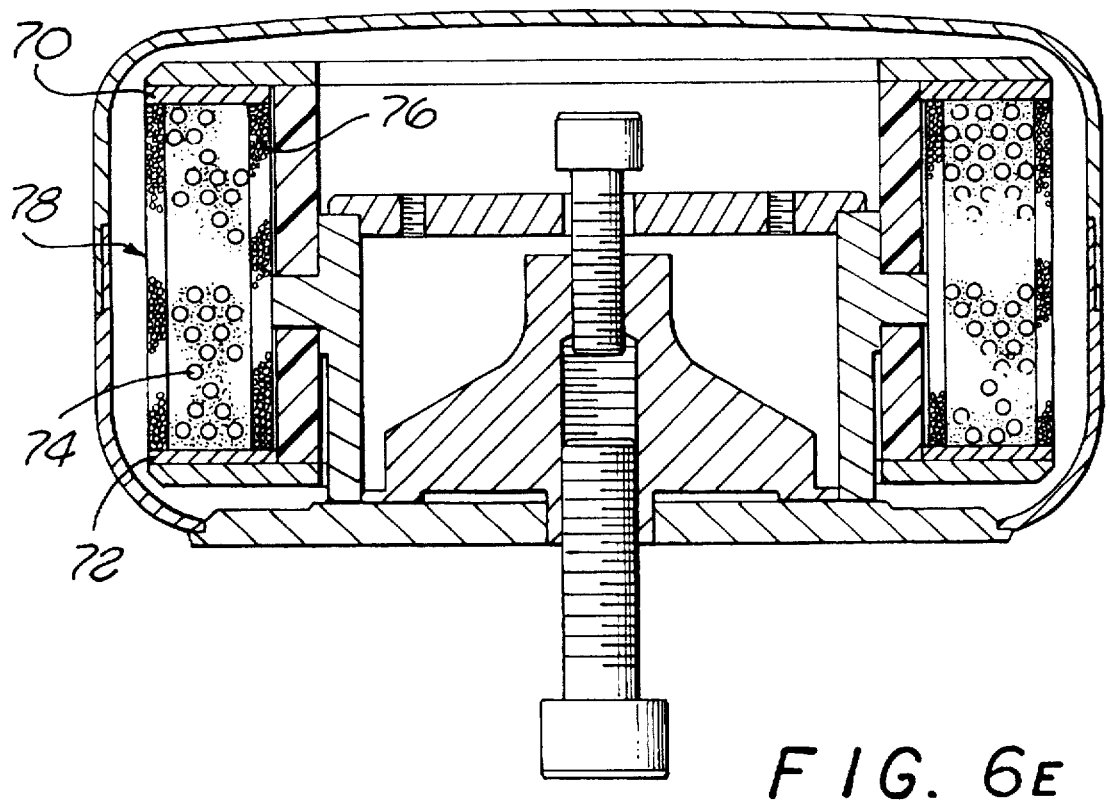

FIG. 6E is a cross-sectional view of a sensor coil 68 in accordance with the invention that is generally based upon the coil design disclosed in U.S. Pat. No. 5,486,922 of Cordova entitled "Sensor Coil With Thermalmechanically-Matched Spool For Fiber optic Gyroscope". The embodiment of FIG. 6E addresses both of the contributions to Shupe bias error discussed above. That is, disks 70 and 72 are located at the ends of rotation-sensitive potted coil 74, thereby replacing turns of the rotation-sensitive coil 74 that would otherwise be subject to high Shupe bias contributions as illustrated by the plots of FIGS. 5A and 5B while inner dummy windings 76 and outer dummy windings 78 replace regions of the rotation sensitive coil 74 otherwise subject to high Shupe bias as illustrated in FIG. 2.

Thus it is seen that the present invention provides an improved sensor coil for a fiber optic gyro. By employing the teachings of this invention one may obtain gyro outputs that are less subject to Shupe bias errors than gyros employing sensor coils in accordance with the prior art.

While this invention has been illustrated with reference to its presently-preferred embodiment, it is not limited thereto. Rather this invention is limited only insofar as it is defined by the following set of patent claims and includes within its scope all equivalents thereof.

What is claimed is:

1. A sensor coil for a fiber optic gyroscope comprising, in combination:

a) a first optical fiber;

b) said first optical fiber being arranged into a plurality of concentric cylindrical layers;

c) each of said layers comprising a plurality of turns of said first fiber;

d) said turns being arranged into a predetermined winding pattern so that said first fiber forms a coil of toroidal shape bounded by substantially cylindrical, concentric inner and outer surfaces and substantially parallel, annular upper and lower surfaces;

e) said coil being encapsulated in potting material; and f) said potted coil including a boundary layer bonded to at least one of said surfaces to form an integral structure with said potted coil.

2. A sensor coil as defined in claim 1 further characterized in that:
   a) said coil is of predetermined thermal expansion characteristics; and
   b) the thermal expansion characteristics of said boundary are substantially the same as those of said potted coil.

3. A sensor coil as defined in claim 2 wherein said boundary comprises at least one layer of windings of a second optical fiber.

4. A sensor coil as defined in claim 3 wherein said layers of said first and second optical fibers are encapsulated within said potting material.

5. A sensor coil as defined in claim 3 wherein a first boundary surrounds said cylindrical outer surface of said potted coil.

6. A sensor coil as defined in claim 3 wherein a second boundary is fixed within said cylindrical inner surface of said potted coil.

7. A sensor coil as defined in claim 2 further characterized in that a substantially-planar boundary is fixed to at least one annular edge plane of said potted coil.

8. A sensor coil as defined in claim 7 wherein said boundary layer comprises at least one annular layer of windings of a second optical fiber.

9. A sensor coil as defined in claim 7 wherein said boundary layer comprises a substantially planar disk of annular shape.

10. A fiber optic gyroscope comprising, in combination:
    a) a source of optical energy;
    b) a detector;
    c) means for coupling the output of said source of optical energy into a sensor coil whereby said output is formed into a pair of beams that counterpropagate within said sensor coil;
    d) means for coupling the output of said sensor coil to said detector;
    e) said sensor coil comprising an integral structure including a responsive member comprising a first optical fiber wound in a predetermined pattern forming a plurality of layers of turns;
    f) said integral structure including a second member fixed to said responsive member, said second member covering a surface of said responsive member; and
    g) said gyroscope is arranged so that the output of said source of optical energy is coupled into said responsive member and the output of said responsive member is coupled to said detector.

11. A fiber optic gyroscope as defined in claim 10 further including:
    a) said responsive member comprises a coil of toroidal shape bounded by substantially cylindrical, concentric inner and outer surfaces and substantially parallel, annular upper and lower surfaces;
    b) said coil being encapsulated in potting material; and
    c) said second member being bonded to at least one of said surfaces to form an integral structure with said potted coil.

12. A fiber optic gyroscope as defined in claim 11 wherein:
    a) said potted coil is of predetermined thermal expansion characteristics; and
    b) the thermal expansion characteristics of said second member are substantially the same as those of said potted coil.

13. A fiber optic gyroscope as defined in claim 12 wherein said second member comprises at least one layer of windings of a second optical fiber.

14. A fiber optic gyroscope as defined in claim 13 wherein said layers of said first and second optical fibers are encapsulated within said potting material.

15. A fiber optic gyroscope as defined in claim 13 wherein said second member comprises a first boundary that surrounds said cylindrical outer surface of said potted coil.

16. A fiber optic gyroscope as defined in claim 13 wherein said second member comprises a second boundary fixed within said cylindrical inner surface of said potted coil.

17. A fiber optic gyroscope as defined in claim 12 further characterized in that said second member comprises a substantially-planar boundary fixed to at least one annular edge plane of said potted coil.

18. A fiber optic gyroscope as defined in claim 17 wherein said boundary comprises at least one annular layer of windings of a second optical fiber.

19. A fiber optic gyroscope as defined in claim 17 wherein said boundary comprises a substantially planar disk of annular shape.

* * * * *